(12) United States Patent  (10) Patent No.: US 7,799,893 B2
Martin  (45) Date of Patent: Sep. 21, 2010

(54) POLYBENZAZOLE BLOCK COPOLYMER

(75) Inventor: Roland Martin, St-Stevens-Woluwe (BE)

(73) Assignee: SOLVAY (Societe anonyme), Brussels (BE)

(*) Notice: Subject to any disclaimer, the term of this patent is extended or adjusted under 35 U.S.C. 154(b) by 596 days.

(21) Appl. No.: 11/718,932

(22) PCT Filed: Nov. 7, 2005

(86) PCT No.: PCT/EP2005/055778

§ 371 (c)(1),
(2), (4) Date: May 9, 2007

(87) PCT Pub. No.: WO2006/051064

PCT Pub. Date: May 18, 2006

(65) Prior Publication Data

US 2008/0003480 A1 Jan. 3, 2008

(30) Foreign Application Priority Data

Nov. 10, 2004 (EP) .................................. 04105666

(51) Int. Cl.
C08G 73/06 (2006.01)

(52) U.S. Cl. ........................ 528/423; 525/88; 525/92 J; 525/535; 525/540; 528/424; 528/377; 528/391; 429/33

(58) Field of Classification Search ................. 528/423, 528/424, 377, 391; 429/33
See application file for complete search history.

(56) References Cited

U.S. PATENT DOCUMENTS

| 5,030,706 | A | * | 7/1991 | Harris et al. ................. 528/183 |
| 5,312,876 | A | | 5/1994 | Dang et al. |
| 2004/0062929 | A1 | | 4/2004 | Loszewski |
| 2004/0062969 | A1 | | 4/2004 | Sakaguchi et al. |
| 2004/0149965 | A1 | | 8/2004 | Otsuki et al. |

FOREIGN PATENT DOCUMENTS

| JP | 2002 201269 | 7/2002 |
| WO | 2004 034499 | 4/2004 |

* cited by examiner

Primary Examiner—Melvin C Mayes
Assistant Examiner—Melissa Stalder
(74) Attorney, Agent, or Firm—Oblon, Spivak, McClelland, Maier & Neustadt, L.L.P.

(57) ABSTRACT

The invention concerns a polybenzazole block copolymer suitable for solid polymer electrolyte membranes application comprising:
at least one block (B1) comprising recurring units (R), more than 50% of said recurring units comprising at least one benzimidazole group (formula 1a and 1b) and at least one sulfonic acid group (formula 2) [recurring units (R1)];

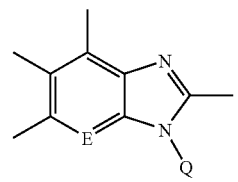

(formula 1a)

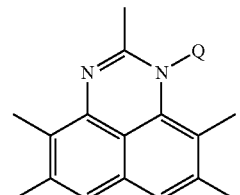

(formula 1b)

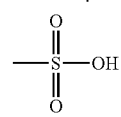

(formula 2)

wherein E in formula 1a can be a substituted or non-substituted carbon atom or nitrogen atom, and Q in formula 1 can be a hydrogen atom or a group comprising a sulfonic acid group; and at least one block (B2) comprising recurring units (R'), more than 50% by moles of said recurring units comprising at least one benzazole group chosen among benzoxazole group (formula 3a and 3b) and benzothiazole group (formula 4a and 4b) [recurring units (R2)],

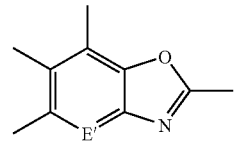
(formula 3a)

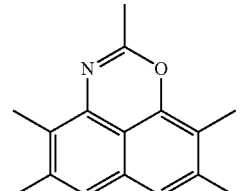

(formula 3b)

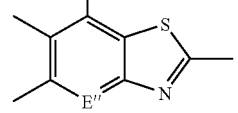

(formula 4a)

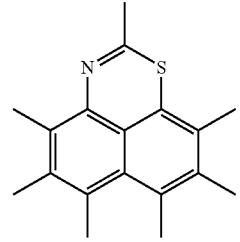

(formula 4b)

wherein E' and E" in formula 3a and 4a, respectively, can be a substituted or non-substituted carbon atom or nitrogen atom, and the block (B2) is free from sulfonic acid groups.

The invention also relates to a polybenzazole polymer composition thereof, a solid polymer electrolyte membrane therefrom, a solid polymer electrolyte doped membrane therefrom, and the fuel cell therefrom.

18 Claims, No Drawings

POLYBENZAZOLE BLOCK COPOLYMER

The present invention relates to a polybenzazole block copolymer of sulfonated benzimidazole and non sulfonated benzoxazole or benzothiazole, suitable for solid polymer electrolyte membranes application, a solid polymer electrolyte membrane therefrom, a solid polymer electrolyte doped membrane therefrom, and the fuel cell therefrom.

Fuel cells are emerging as practical and versatile power sources, which can be more efficient and less environmentally damaging than rival technologies. From mobile phones and electrical vehicles to spacecraft and multi-megawatt power station, the application potential for fuel cells is growing rapidly. Fuel cells have much in common with batteries, which also convert energy that is stored in chemical form into electricity. In contrast to batteries, however, they oxidize externally supplied fuel and therefore do not have to be recharged.

Fuel cells can be configured in numerous ways with a variety of electrolytes, fuels and operating temperatures. For example, fuels such as hydrogen or methanol can be provided directly to the fuel cell electrode or fuels such as methane or methanol can be converted to a hydrogen rich gas mixture external to the cell itself (fuel reforming) and subsequently provided to the fuel cell. Air is the source of oxygen in most fuel cells, although in some applications, the oxygen is obtained by hydrogen peroxide decomposition or from a cryogenic storage system.

Although there are theoretically a limitless number of combinations of electrolyte, fuel, oxidant, temperatures and so on, practical systems are in many cases based on proton exchange membrane fuel cell (PEMFC) technology, characterized by solid polymer electrolyte systems using hydrogen or methanol as the fuel source and oxygen or air as the oxidant. Further, the PEMFC can be miniaturized as compared with other types of fuel cells and is suitable as mobile power source or as small capacity power source.

The polymer electrolyte membrane forming the heart of the PEMFC acts as a proton-exchange membrane, and must have excellent ion conductivity, physical strength, gas barrier properties, chemical stability, electrochemical stability and thermal stability at the operating conditions of the fuel cell.

Membranes currently used in PEMFC are perfluorinated sulfonic acid (PFSA) polymers such as NAFION resins from DuPont. Even if such membranes have demonstrated good performances, appreciable long-term stability in both oxidative and reductive environments and valuable protonic conductivity under fully hydrated conditions (80-100% relative humidity, RH hereafter), they are limited to low temperatures (up to 80° C.), require a sophisticated water management (system complexity), and due to methanol crossover, are unpractical for DMFC (direct methanol fuel cell).

Great efforts have been made in academic and industrial laboratories to develop proton exchange membranes for operation at temperatures above 100° C.

By far the most promising approach is the polybenzimidazole (PBI)/$H_3PO_4$ acid doped membrane, which does not require any external humidification, possesses high proton conductivity (at temperature exceeding 150° C.), with little effect of product water, have a near zero electro-osmotic water drag and an at least ten times lower methanol permeability as compared to NAFION® resins.

However, current PBI/$H_3PO_4$ doped membrane suffers from important drawbacks. Because of the high acid doping levels required to attain sufficient conductivity, the mechanical strength is limited due to plasticizing. Also, acid gets depleted over time, particularly during start-up and shut down when it is washed by liquid product water.

While polybenzazoles (PBZ) polymers have no significant intrinsic ionic conductivity, they have been modified by a protogenic group, generally a sulfonic acid group, to provide sulfonated polybenzazoles (sPBZ), especially sulfonated polybenzimidazoles (sPBI), which have been used at low or zero doping level.

Thus US 2004/0062929 (to Toyo Boseki) discloses benzazole homo- and copolymers bearing sulfonic or phosphonic acid groups, for fuel cells polymer electrolyte membranes, wherein the ionic group is attached to the residues of the dicarboxylic acid.

Example 5 describes the preparation of a polymer obtained by polymerisation of 3,3',4,4'-tetraminodiphenylsulfone (TAS, hereinafter) and of terephtalic acid (TPA, hereinafter), followed by further addition of TAS and 2,5-dicarboxybenzenesulfonic acid monosodium salt (STA, hereinafter), providing for a block copolymer, comprising recurring unit of sulfonated and non-sulfonated polybenzimidazole. Ion conductivity of the membrane obtained from this block copolymer was one order of magnitude less than the ion conductivity of the corresponding random copolymer prepared by polymerizing TAS with a mixture of STA and TPA (see scheme 1).

(Scheme 1)

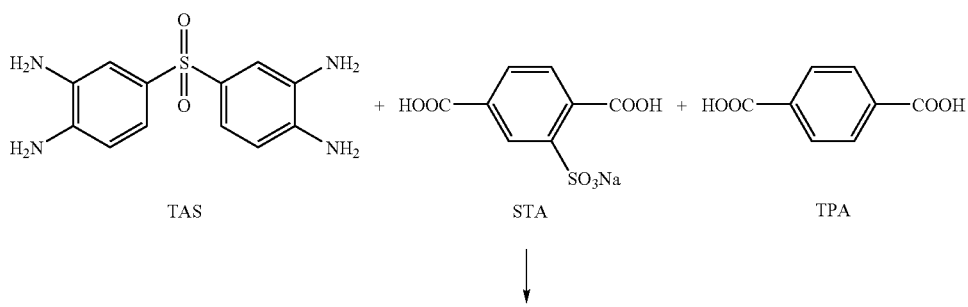

-continued
random or block copolymer

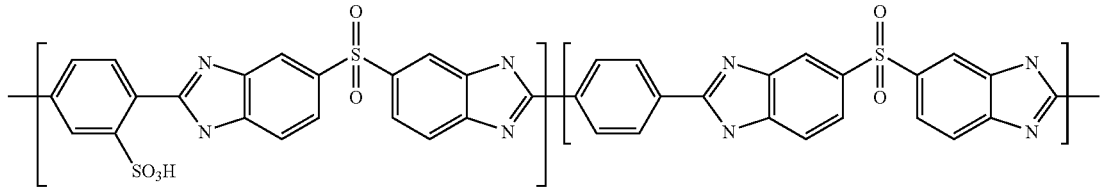

Polybenzazole copolymers bearing ionic group (—SO$_3$H and —PO$_3$H$_2$) responding to general formula (A) here below are also described in JP 2002/201269 (to Toyobo Co. Ltd.):

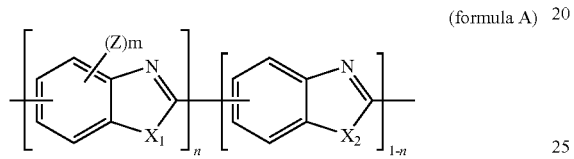
(formula A)

wherein Z is a sulfonic or phosphonic acid group, m is an integer from 1 to 3, n is comprised between 0 and 1 and X1 and X2 are the same or different and each independently —S—, —O—, —NH— or a group selected from the structures here below:

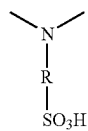

WO 2004/034499 (to Celanese Ventures) discloses sulfonic-acid containing polyazoles (co)polymer, obtained polymerizing one or several aromatic or heteroaromatic tetramino or bis(orthoaminohydroxy) or bis(orthoaminothiol) compounds (XX-monomers) with one or several aromatic dicarboxylic acids (YY-monomers), wherein at least a part of the XX- or YY-monomers comprises at least one sulfonic acid group.

However, in sulfonated polybenzazole of the prior art, while attempt is made to increase sulfonation to maximize ion conductivity, at the same time the presence of protogenic group causes unacceptable degree of swelling or even complete dissolution in water or in methanol and unsatisfactory mechanical properties of the membrane.

According to the present invention, the above-mentioned difficulties are remarkably overcome by a polybenzazole block copolymer of sulfonated benzimidazole and non sulfonated benzoxazole or benzothiazole.

The control of the location, number, and distribution of the acid functions along the polybenzazole block copolymer advantageously provides more stable structures and allows tuning of concomitant salient properties such as conductivity and solubility.

Another object of the invention is a polybenzazole polymer composition comprising said polybenzazole block copolymer.

Another object of the invention is a solid polymer electrolyte membrane comprising said polybenzazole block copolymer.

Another object of the invention is a doped solid polymer electrolyte membrane comprising said polybenzazole block copolymer.

Still an object of the invention is a fuel cell comprising said polybenzazole block copolymer.

Thanks to its outstanding thermal resistance, high ion conductivity even at reduced relative humidity, insolubility, low permeability, low swelling both in water, water/methanol and methanol, the polybenzazole block copolymer of the invention advantageously enables increasing fuel cell operating temperature window, thus allowing for increased catalytic activity, speeding up electrode kinetics, giving improved fuel cell efficiency and reduction of precious metal load, simplifying thermal management, enabling easier and more effective cooling efficiency; and increased value in heat recovery, comprising heat supply to internal steam reformer (for methanol or methane indirect fuel cells) or hydrogen desorption from metal hydride storage systems, all the above without the drawbacks of the polymer of the prior art.

Thanks to good solubility properties, the polybenzazole block copolymer of the invention would be easily casted into shaped articles and films.

The solid polymer electrolyte membrane and/or doped membrane comprising the block copolymer of the invention possesses outstanding conductivity, solvent and temperature resistance, mechanical properties and reduced permeability to water and/or methanol, without the drawbacks of the membranes of the prior art.

As a consequence of the high operating temperature, operations of fuel cells comprising the block copolymer of the invention could be carried out at reduced humidification degree and/or limited doping level, with no need of complex water management systems, owing to a self-regulation of the internal degree of humidification, thus enabling simplified stack construction and improved reliability.

According to the present invention, a first object is to provide a polybenzazole block copolymer comprising:
at least one block (B1) comprising recurring units (R), more than 50% by moles of said recurring units comprising at least one benzimidazole group (formula 1a and 1b) and at least one sulfonic acid group (formula 2) [recurring units (R1)];

(formula 1a)

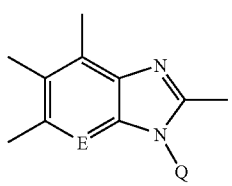

(formula 1b)

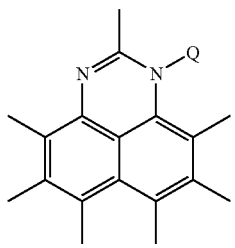

(formula 2)

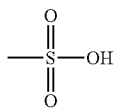

wherein E in formula 1a can be a substituted or a non-substituted carbon atom or nitrogen atom, and Q in formula 1a and 1b can be a hydrogen atom or a group comprising a sulfonic acid group; and at least one block (B2) comprising recurring units (R'), more than 50% by moles of said recurring units comprising at least one benzazole group chosen among benzoxazole group (formula 3a and 3b) and benzothiazole group (formula 4a and 4b) [recurring units (R2)], (formula 3a)

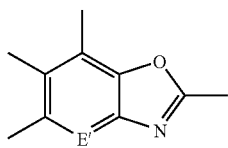

(formula 3b)

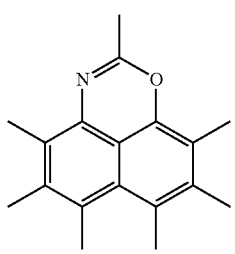

(formula 4a)

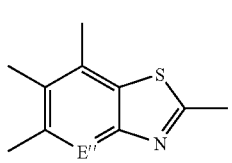

-continued (formula 4b)

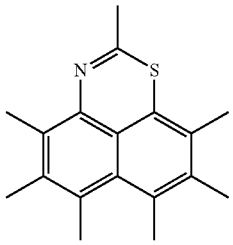

wherein E' and E" in formula 3a and 4a respectively, can be independently a substituted or non-substituted carbon atom or nitrogen atom, and the block (B2) is substantially free from sulfonic acid groups.

The recurring units (R1) are advantageously chosen among recurring units (R1-a), recurring units (R1-b), recurring units (R1-c), recurring units (R1-d) and mixture thereof:

(R1-a)

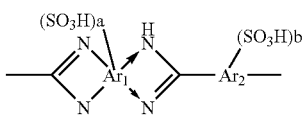

(R1-b)

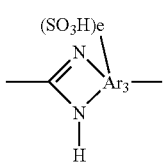

(R1-c)

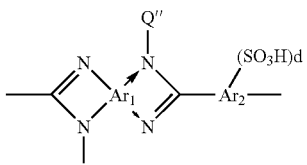

(R1-d)

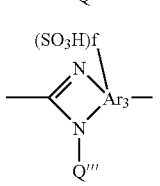

wherein:
the → denotes isomerism so that in any recurring unit within the aromatic benzimidazole structure, the groups to which the arrows point may exist as shown or in an interchanged position;
the

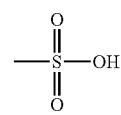

groups may be linked to anyone of the carbon atoms in the $Ar_1$, $Ar_2$ or $Ar_3$ groups;

a is an integer from 0 to 2;
b is an integer from 1 to 2;
d is an integer from 0 to 2
e is an integer from 1 to 2;
f is an integer from 0 to 2
$Ar_1$ is typically:

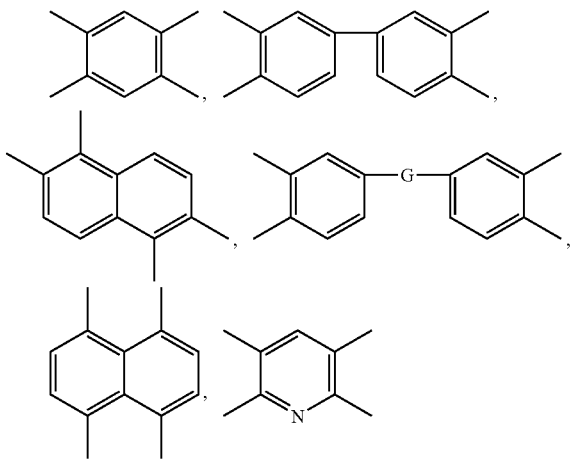

with G=

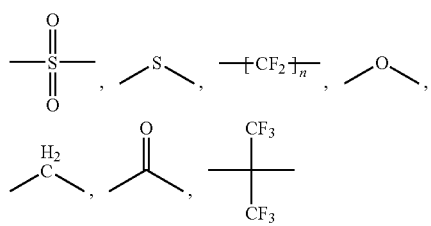

and with n=0,1,2,3,4 or 5;
$Ar_2$ is typically:

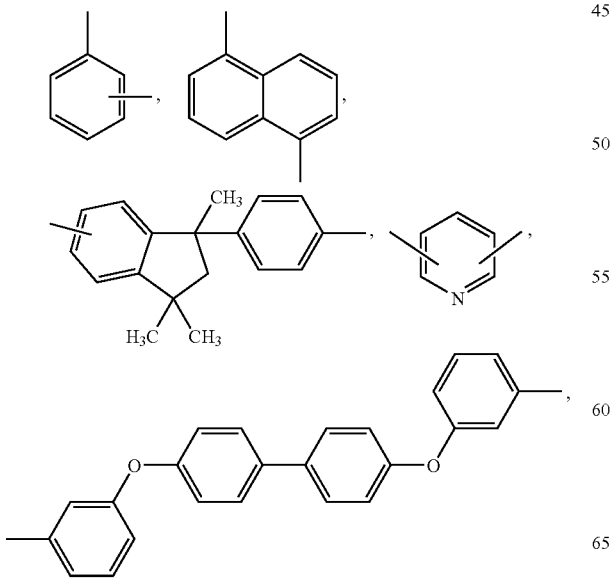

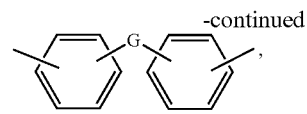

with G having the same meaning as previously indicated;

$Ar_3$ is typically:

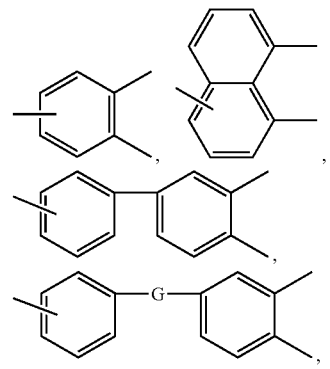

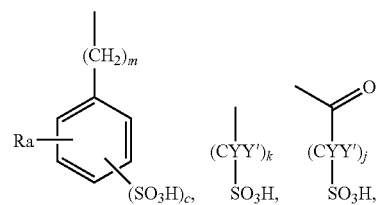

with G having the same meaning as previously indicated;

each of the Q', Q", Q''' moiety can be independently either a hydrogen atom or a group comprising a sulfonic acid group chosen among the following:

with Ra being a linear or branched alkyl, alkylaryl, aryl or $-NO_2$ group, m being an integer from 0 to 10 and c being an integer from 1 to 2, Y and Y' being independently a hydrogen atom, a fluorine atom, a linear or branched hydrocarbon or fluorocarbon $C_2$-$C_5$ chain, and k and j being independently an integer from 1 to 10;

with the further requirement that if d and f are zero, at least one of Q', Q" and Q''' moieties comprises at least one sulfonic acid group. The Q', Q" and/or Q''' moiety comprising at least one sulfonic acid group is preferably chosen among:

(q1)

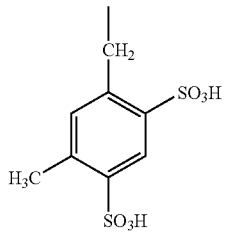
(q2)

and mixtures thereof.

Preferably recurring units (R1) are chosen among the group consisting of:

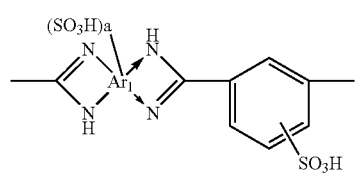
(r₁-i)

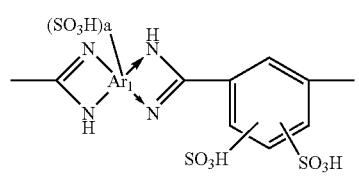
(r₁-ii)

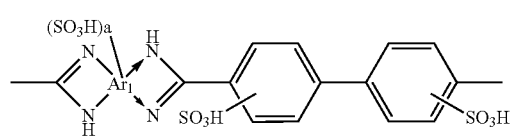
(r₁-iii)

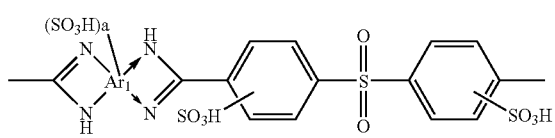
(r₁-iv)

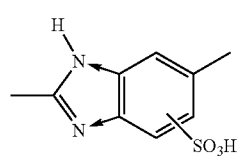
(r₁-v)

and mixtures thereof, wherein, in formulae r₁-i to r₁-v here above:
the → denotes isomerism so that in any recurring unit within the aromatic benzimidazole structure, the groups to which the arrows point may exist as shown or in an interchanged position;

a is an integer from 0 to 2;
Ar₁ has the same meaning as above described;
the

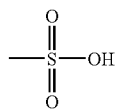

groups may be linked to anyone of the carbon atoms of the Ar₁ group or of the phenyl ring which they are linked to.

More preferably recurring units (R1) are chosen among the group consisting of:

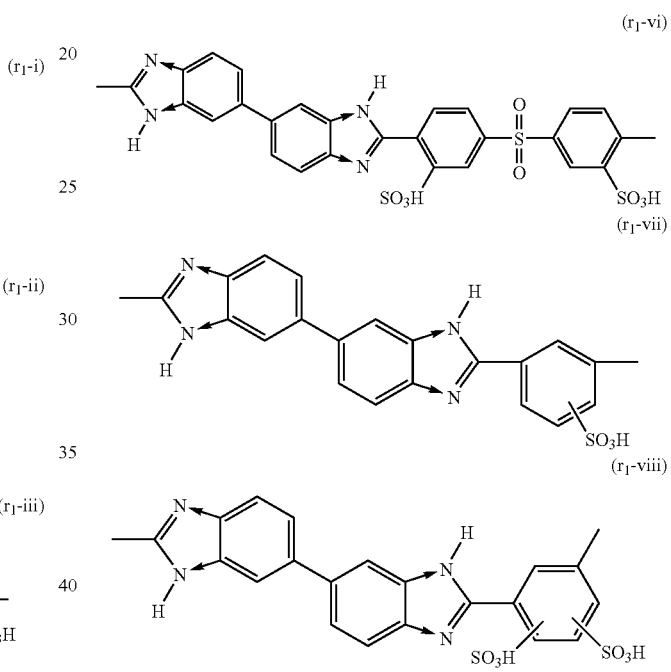

wherein in formulae (r₁-vi) to (r₁-viii) here above the → denotes isomerism so that in any recurring unit within the aromatic benzimidazole structure, the groups to which the arrows point may exist as shown or in an interchanged position;

More than 50% wt of the recurring units of block B1 (R) are recurring units (R1). Preferably more than 75% wt of recurring units (R) are recurring units (R1). Still more preferably, block B1 does not comprise recurring units other than recurring units (R1).

The block B1 comprises advantageously at least 3, preferably at least 7, more preferably at least 10 recurring units (R).

The block B1 advantageously comprises at most 150, preferably at most 100, more preferably at most 50 recurring units (R).

The number of recurring units of block B1 can be notably determined by NMR spectroscopy according to methods well-known to those skilled in the art. These methods typically require derivatization of end-groups.

The block B1 is advantageously amorphous.

The block B1 has a sulfur to nitrogen molar ratio (S/N) of advantageously at least 0.25, preferably of at least 0.5.

The block B1 has an ion exchange capacity of advantageously at least 2.0 meq/g, preferably at least 2.5 meq/g, more preferably at least 3.0 meq/g.

Pre-polymer comprising at least one block B1 can be notably prepared by a polymerization process comprising either:

reacting in polycondensation conditions at least one dicarboxylic acid monomer (AA-type monomer) with at least one tetraamine monomer (BB-type monomer), wherein at least one of the monomer comprises at least one sulfonic acid group; or reacting in polycondensation conditions at least one diamino-carboxylic acid monomer (AB-type monomer) bearing at least one sulfonic acid group; or reacting in polycondensation conditions a mixture of at least one dicarboxylic acid monomer (AA-type monomer) with at least one tetraamine monomer (BB-type monomer) and of at least one diamino-carboxylic acid monomer (AB-type monomer), wherein at least one of the monomers comprises at least one sulfonic acid group.

In these polymerization processes, at least one monomer comprises at least one sulfonic acid group.

As an alternative, pre-polymer comprising at least one block B1 can be notably prepared by a polymerization process comprising either:

reacting in polycondensation conditions at least one dicarboxylic acid monomer (AA-type monomers) with at least one tetraamine monomer (BB-type monomers), wherein none of the monomer(s) comprises a sulfonic acid group; or reacting in polycondensation conditions at least one diamino-carboxylic acid monomer (AB-type monomer) free from sulfonic acid group; or reacting in polycondensation conditions a mixture of at least one dicarboxylic acid monomer (AA-type monomer) with at least one tetraamine monomer (BB-type monomer) and of at least one diamino-carboxylic acid monomer (AB-type monomer), wherein none of the monomers comprises a sulfonic acid group, to prepare a pre-polymer comprising at least one block B1', and then functionalizing block B1' by introducing sulfonic acid groups.

In these alternative polymerization processes, all the monomers are free from sulfonic acid group, which are then introduced by functionalization.

Preferably, the pre-polymers comprising at least one block B1 are prepared by polymerization processes wherein at least one monomer comprises at least one sulfonic acid group, as above detailed.

To the purposes of the invention, the term "dicarboxylic acid monomer" is intended to denote an aromatic compound comprising at least two carboxylic acid groups as such or in their salt, ester, or acid halide form.

Aromatic dicarboxylic acid and derivative thereof employed as dicarboxylic acid monomers are not particularly restricted. As specific examples, aromatic dicarboxylic acids such as terephtalic acid, 1,3-benzenedicarboxylic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene and derivatives thereof such as alkaline metal salts of sodium, potassium, ammonium and the like can be listed.

Specific examples of dicarboxylic acid monomers comprising at least one sulfonic acid group are 2,5-dicarboxybenzenesulfonic acid, 3,5-dicarboxybenzenesulfonic acid, 2,5-dicarboxy-1,4-benzenedisulfonic acid, 4,6-dicarboxy-1,3-benzene-disulfonic acid, 4,4'-dicarboxy-3,3'-(biphenylsulfone)disulfonic acid, as well as and derivatives thereof such as alkaline metal salts of sodium, potassium, ammonium and the like.

To the purposes of the invention, the term "tetraamine monomer" is intended to denote an aromatic compound comprising at least two ortho-diamine groups as such and/or as salts with acids such as hydrochloric acid, sulfuric acid and phosphoric acid.

While aromatic tetraamine and derivatives thereof employable as tetraamine monomers are not particularly restricted, 1,1'-biphenyl-3,3',4,4'-tetramine, 1,2,4,5-tetraaminobenzene, 3,3',4,4'-tetraaminodiphenyl ether, 3,3',4,4'-tetraminodiphenyl thioether, 3,3',4,4'-tetraminodiphenylsulfone, 2,2-bis(3,4-diaminophenyl)propane, bis(3,4-diamonophenyl)methane, 2,2-bis(3,4-diaminophenyl)hexafluoropropane, 2,2-bis(3,4-diaminophenyl)ketone, bis(3,4,-diaminophenoxy)benzene and derivatives thereof, such as salts with acids such as hydrochloric acid, sulfuric acid and phosphoric acid can be listed as examples.

To the purpose of the invention, the term "diamino-carboxylic acid monomer" is intended to denote an aromatic compound comprising at least one carboxylic acid group as such or in its salt, ester, or acid halide, and at least one ortho-diamine group as such and/or as salts with acids such as hydrochloric acid, sulfuric acid and phosphoric acid.

To the purpose of the invention, the term "pre-polymer comprising at least one block B1" is intended to denote a polymer comprising at least one block B1, as above defined, which can be used as precursor for preparing the polybenzazole block copolymer of the invention.

To the purpose of the invention, the term "block B1'" denotes a block comprising recurring units (R"), more than 50% of said recurring units comprising at least one benzimidazole group (formula 5a and 5b), free from sulfonic acid group (formula 2) [recurring units (R3)]:

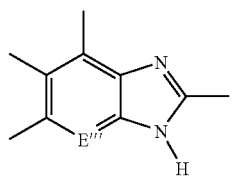

(formula 5a)

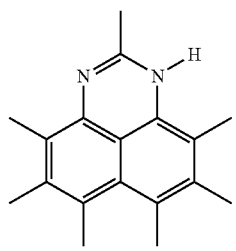

(formula 5b)

wherein E'" in formula 5a can be a substituted or non-substituted carbon atom or nitrogen atom.

The recurring units (R3) are advantageously chosen among recurring units (R3-a), recurring units (R3-b), and mixture thereof:

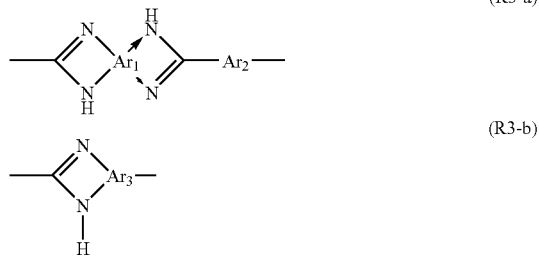

wherein
the → denotes isomerism so that in any recurring unit within the aromatic benzimidazole structure, the groups to which the arrows point may exist as shown or in an interchanged position;

$Ar_1$, $Ar_2$ or $Ar_3$ have the same meaning as above indicated.

The reaction between AA- and BB-type monomers or of AB-type monomer(s) can be advantageously carried out in polyphosphoric acid (PPA) at a temperature between 100 and 240° C. PPA generally acts as solvent, catalyst and dehydrating agent. The term PPA is intended to denote a mixture of condensed phosphoric acid oligomers of general formula:

$$H_{n+2}P_nO_{3n+1}$$

wherein the average value of n depends on the ratio of water to phosphorus pentoxide ($P_2O_5$).

The composition of PPA will be described hereinafter by the $P_2O_5$ weight content, expressed as percent of the weight of the $P_2O_5$ divided by the total weight of PPA.

In carrying out the process, shall the tetraamine monomers or diamino carboxylic acid monomer(s) be available as hydrochloric acid salts, substantially stoichiometric amounts of the AA- and BB-type monomers and/or the required amount of AB-type monomer(s) are advantageously first heated at 40-80° C. in PPA (50 to 80% wt $P_2O_5$) to advantageously effect dehydrochlorination. This step is advantageously carried out under reduced pressure to facilitate removal of the hydrogen chloride. After complete dehydrochlorination, or after mixing the monomer(s) in PPA in case tetraamine monomers and/or diamino carboxylic acid monomer(s) are available as such, an additional quantity of $P_2O_5$ and/or PPA may be added as required to provide a stirrable mixture and to increase the concentration of PPA within the range of 80-86% wt $P_2O_5$. During the polycondensation reaction, additional amount of PPA may be added for maintaining the concentration of PPA advantageously between 80-86% wt, preferably between 82-84% wt $P_2O_5$. It is preferred to carry out the polymerization in stages, i.e. a step-wise heating schedule is employed. Such a schedule is preferred because immediately exposing the reaction mixture to relatively high polymerization temperature may cause decomposition of one or more monomers. The selection of a particular step-wise heating schedule is obvious to one of ordinary skill in the art. While an optimum polymerization temperature is not unconditionally definable, because this optimum depends on the combination of monomers, temperature exceeds, at least in one step of the polymerization, advantageously 100° C., preferably 120° C., more preferably 140° C. An exemplary heating schedule is for instance 60° C. for 4 hours, 100° C. for 2 hours, 160° C. for 24 hours and 190° C. for 4 hours.

Shall the monomer(s) be AA and BB monomers, an equimolecular mount of AA- and BB-type monomers generally enables preparation of a pre-polymer terminated carboxylic acid group from one side and with a ortho-diamine group from the other side, a slight excess of AA-type monomer(s) (typically less than 10% mol, preferably less than 5% mol) with respect to stoichiometric, generally enables preparation of a pre-polymer terminated with carboxylic acid groups, and a slight excess of BB-type monomer (typically less than 10% mol, preferably less than 5% mol) generally enables preparation of a pre-polymer terminated with ortho-diamine group.

Shall the monomer(s) be AB monomer, a pre-polymer terminated with a carboxylic acid group from one side and with a ortho-diamine group from the other side is generally obtained.

Thus, by means of the polymerization process as above described, it is advantageously possible to prepare a pre-polymer comprising at least one B1 or B1' block terminated by an azole-forming group.

For the purpose of the invention, the term "azole-forming group" is intended to denote a group able to react with another suitable azole-forming group to form an azole ring, i.e. imidazole, thiazole or oxazole ring.

Examples of "azole-forming groups" include carboxylic acid groups, in their acid, acid halide, ester or salt form, ortho-diamine groups (formula 6), ortho-aminohydroxy groups (formula 7), ortho-aminothiol groups (formula 8).

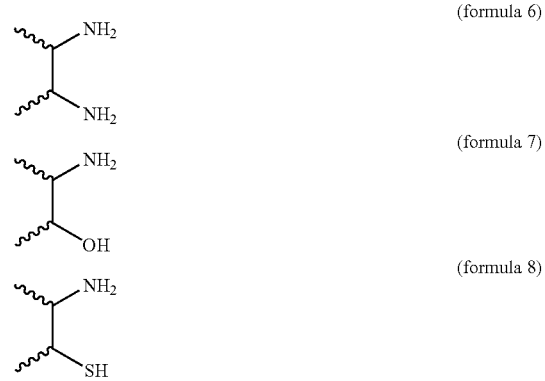

Functionalization of block B1' by introducing sulfonic acid groups may be notably carried out by any method well-known to those skilled in the art, such as sulfonation of the aromatic ring, sulfonation, sulfoalkylation and the like.

Sulfonation of the block B1' can be advantageously achieved by treating the block B1' with a mixture of sulfuric acid or chlorosulfonic acid to obtain the sulfonated block B1.

Sulfination of the block B1' can be advantageously achieved by treating the block B1' with a strong base, preferably with an hydride, such as sodium hydride or a metal alkyl, such as nButyllithium in anhydrous aprotic solvent, such as DMSO, to form a polyanion of block B1' and treating the resulting polyanion with $SO_2$ at low temperature (typically −30 to −80° C.), followed by a treatment with an oxidizing agent such as $H_2O_2$, NaOCl, $KMnO_4$ and the like to obtain the corresponding sulfonated block B1.

Sulfoalkylation of the block B1' can be advantageously achieved by treating the block B1' with a strong base, preferably with an hydride, such as sodium hydride or a metal alkyl, such as nButyllithium in anhydrous aprotic solvent, such as DMSO, to form a polyanion of block B1' and treating the resulting polyanion with a suitable sultone compound, such as 1,3-propanesultone, 1,2,2-trifluoro-2-hydroxy-1-trifluoromethylethane sulfonic acid sultone and the like, or with a halomethyl-benzenesulfonate salt, such as sodium 4-(bromomethyl)benzenesulfonate at a temperature between 25 and 150° C. to obtain the corresponding sulfonated block B1.

To the purpose of the invention, the term "block B2 substantially free from sulfonic acid groups" is understood to mean that block B2 is prepared from monomers free from sulfonic acid groups.

Preferably the block B2 is totally free from sulfonic acid groups.

The recurring units (R2) are advantageously chosen among recurring units (R2-a), recurring units (R2-b) and mixture thereof:

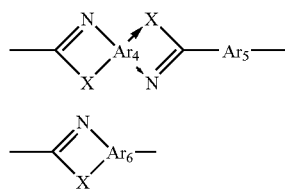
(R2-a)

(R2-b)

wherein
the → denotes isomerism so that in any recurring unit within the aromatic benzimidazole structure, the groups to which the arrows point may exist as shown or in an interchanged position;
X is an oxygen or sulfur atom;
Ar$_4$ is typically

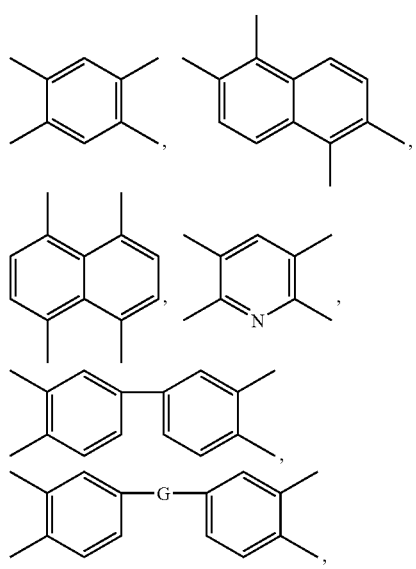

with G=

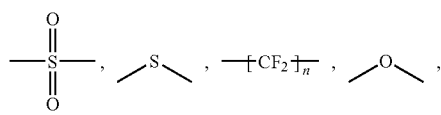

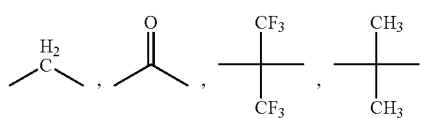

and with n=0, 1, 2, 3, 4 or 5;
Ar$_5$ is typically:

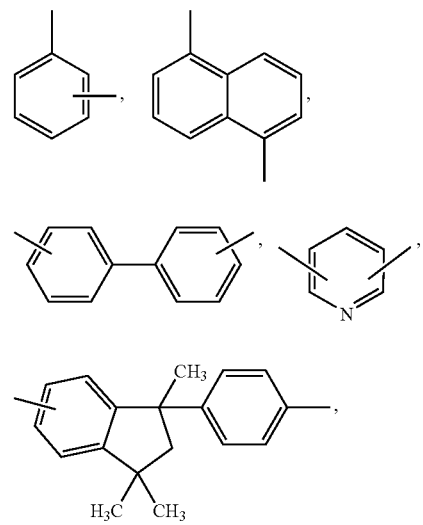

with G having the same meaning as previously indicated;
Ar$_6$ is typically:

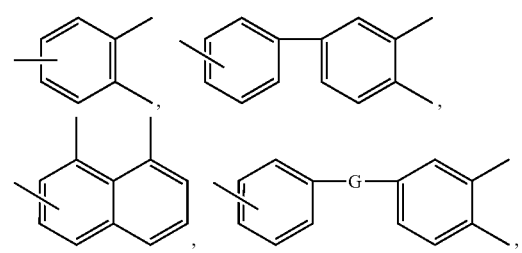

with G having the same meaning as previously indicated.

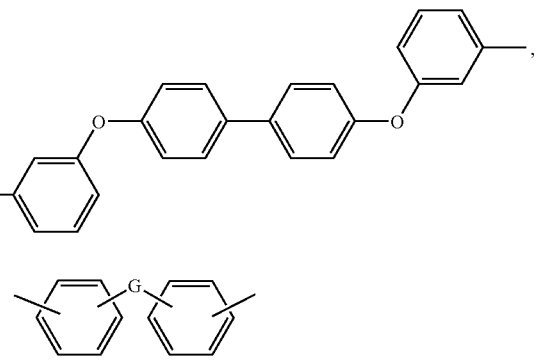

Preferably recurring units (R2) are chosen among the group consisting of:

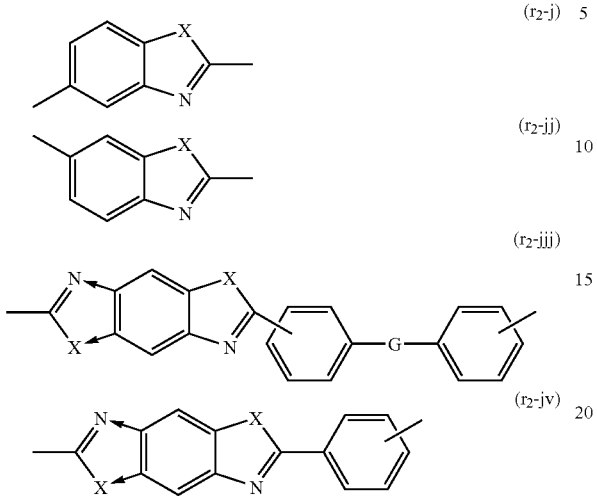

and mixtures thereof, wherein, in formulae $r_2$-j to $r_2$-jv here above:
the → denotes isomerism so that in any recurring unit within the aromatic benzazole structure, the groups to which the arrows point may exist as shown or in an interchanged position;
X is an oxygen or sulfur atom;
G has the same meaning as above described.

More preferably recurring units (R2) are chosen among the group consisting of:

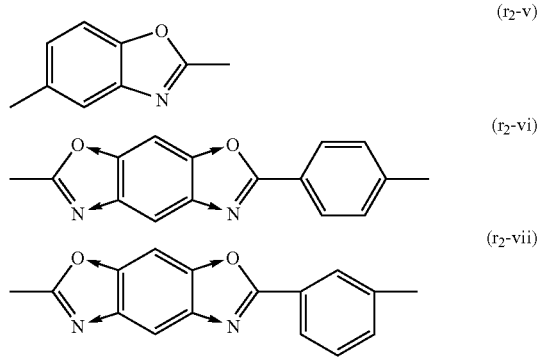

wherein, in formulae $r_2$-v to $r_2$-vii here above the → denotes isomerism so that in any recurring unit within the aromatic benzazole structure, the groups to which the arrows point may exist as shown or in an interchanged position.

More than 50% wt of the recurring units of block B2 (R') are recurring units (R2). Preferably more than 75% wt of recurring units (R') are recurring units (R2). Still more preferably, block B2 does not comprise recurring units other than recurring units (R2).

The block B2 comprises advantageously at least 3, preferably at least 7, more preferably at least 20 recurring units (R').

The block B2 advantageously comprises at most 150, preferably at most 100, more preferably at most 75 recurring units (R').

The number of recurring units of block B2 can be notably determined by NMR spectroscopy according to methods well-known to those skilled in the art. These methods typically require derivatization of end-groups.

Pre-polymer comprising at least one block B2 can be notably prepared by a polymerization process comprising either:
reacting in polycondensation conditions at least one dicarboxylic acid monomer (aa-type monomers) with at least one diaminediol- or diaminedithiol-monomer (bb-type monomers), wherein the monomers are free from sulfonic acid group; or
reacting in polycondensation conditions at least one hydroxyamino-carboxylic acid- or thioamino-carboxylic acid-monomer (ab-type monomer) free from sulfonic acid group; or
reacting in polycondensation conditions a mixture of at least one dicarboxylic acid monomer (aa-type monomer) with at least one tetraamine monomer (bb-type monomer) and of at least one diamino-carboxylic acid monomer (ab-type monomer), wherein the monomers are free from sulfonic acid group.

The term "dicarboxylic acid monomer" has the meaning as above defined.

To the purpose of the invention, the term "diaminediol monomer" is intended to denote an aromatic compound carrying at least two ortho-aminohydroxy groups as such and/or as salts with acids such as hydrochloric acid, sulfuric acid and phosphoric acid.

As examples of diaminediol monomers, mention may be notably made of 2,5-dihydroxyparaphenylenediamine, 4,6-dihydroxymethaphenylenediamine, 3,3'-dihydroxybenzidine, 3,3'-diamino-4,4'-diphenylbenzenediol, bis(4-amino-3-hydroxyphenyl)ether, bis(3-amino-4-hydroxyphenyl)ether, bis(4-amino-3-hydroxyphenyl)thioether, bis(3-amino-4-hydroxyphenyl)thioether, bis(4-amino-3-hydroxyphenyl)sulfone, bis(3-amino-4-hydroxyphenyl)sulfone, 2,2-bis(4-amino-3-hydroxyphenyl)propane, 2,2-bis(3-amino-4-hydroxyphenyl) propane, bis(4-amino-3-hydroxyphenyl)methane, bis(3-amino-4-hydroxyphenyl)methane, 2,2-bis(4-amino-3-hydroxyphenyl)hexafluoropropane, 2,2-bis(3-amino-4-hydroxyphenyl)hexafluoropropane, 2,2-bis(4-amino-3-hydroxyphenyl)ketone, 2,2-bis(3-amino-4-hydroxyphenyl)ketone, bis(4-amino-3-hydroxyphenoxy) benzene, bis(3-amino-4-hydroxyphenoxy)benzene, and of their corresponding derivatives such as salts with hydrochloridric acid, suforic acid and phosphoric acid.

To the purpose of the invention, the term "diaminedithiol-monomer" is intended to denote an aromatic compound carrying at least two ortho-aminothiol groups as such and/or as salts with acids such as hydrochloric acid, sulfuric acid and phosphoric acid.

As examples of diaminedithiol monomers, mention may be notably made of 2,5-diamino-1,4-benzenedithiol, 4,6-diamino-1,3-benzenedithiol, 2,5-diamino-3,6-dimethyl-1,4-benzenedithiol, 3,3'-dimercaptobenzidine, 3,3'-diamino-4,4'-diphenylbenzenedithiol, bis(4-amino-3-mercaptophenyl) ether, bis(3-amino-4-mercaptophenyl)ether, bis(4-amino-3-mercaptophenyl)thioether, bis(3-amino-4-mercaptophenyl)thioether, bis(4-amino-3-mercaptophenyl)sulfone, bis(3-amino-4-mercaptophenyl)sulfone, 2,2-bis(4-amino-3-mercaptophenyl)propane, 2,2-bis(3-amino-4-mercaptophenyl) propane, bis(4-amino-3-mercaptophenyl)methane, bis(3-amino-4-mercaptophenyl)methane, 2,2-bis(4-amino-3-mercaptophenyl)hexafluoropropane, 2,2-bis(3-amino-4-mercaptophenyl)hexafluoropropane, 2,2-bis(4-amino-3-mercaptophenyl)ketone, 2,2-bis(3-amino-4-mercaptophenyl)ketone, bis(4-amino-3-mercaptophenoxy)

benzene, bis(3-amino-4-mercaptophenoxy)benzene and of their corresponding derivatives such as salts with hydrochloridric acid, suforic acid and phosphoric acid.

To the purpose of the invention, the term "hydroxyamino-carboxylic acid-monomer" is intended to denote an aromatic compound carrying at least one carboxylic acid group as such or in its salt, ester, or acid halide, and at least one ortho-hydroxyamine group as such and/or as salts with acids such as hydrochloric acid, sulfuric acid and phosphoric acid.

As examples of hydroxyamino-carboxylic acid monomers, mention may be notably made of 3-amino-4-hydroxybenzoic acid, 4-amino-3-hydroxybenzoic acid and of their corresponding derivatives such as salts with hydrochloridric acid, suforic acid and phosphoric acid.

To the purpose of the invention, the term "thioamino-carboxylic acid monomer" is intended to denote an aromatic compound comprising at least one carboxylic acid group as such or in its salt, ester, or acid halide, and at least one ortho-thioamine group as such and/or as salts with acids such as hydrochloric acid, sulfuric acid and phosphoric acid.

As examples of thioamino-carboxylic acid monomers, mention may be notably made of 3-mercapto-4-aminobenzoic acid, of 4-mercapto-3-aminobenzoic acid and of their corresponding derivatives such as salts with hydrochloridric acid, suforic acid and phosphoric acid.

To the purpose of the invention, the term "pre-polymer comprising at least one block B2" is intended to denote a polymer comprising at least one block B2, as above defined, which can be used as precursor for preparing the polybenzazole block copolymer of the invention.

The reaction between aa- and bb-type monomers and/or of ab-type monomer(s) can be advantageously carried out in polyphosphoric acid (PPA) at a temperature between 100 and 240° C. PPA generally acts as solvent, catalyst and dehydrating agent.

In carrying out the process, shall the diaminedithiol-, diaminediol-, thioamino-carboxylic acid-, hydroxyamino-carboxylic acid-monomer(s) be available as hydrochloridric acid salts, substantially stoichiometric amounts of the aa- and bb-type monomers or the required amount of ab-type monomer(s) are advantageously first heated at 40-80° C. in PPA (50 to 80% wt $P_2O_5$) to typically effect dehydrochlorination. This step is advantageously carried out under reduced pressure to facilitate removal of the hydrogen chloride. After complete dehydrochlorination, or after mixing the monomer(s) in PPA in case diaminedithiol-, diaminediol-, thioamino-carboxylic acid-, hydroxyamino-carboxylic acid-monomer(s) are available as such, an additional quantity of $P_2O_5$ and/or PPA may be added as required to provide a stirrable mixture and to increase the concentration of PPA to about 80-85% wt $P_2O_5$. During the polycondensation reaction, additional amount of PPA may be added for maintaining the concentration of PPA advantageously between 80-86% wt, preferably between 82-84% wt $P_2O_5$. It is preferred to carry out the polymerization in stages, i.e. a step-wise heating schedule is employed. Such a schedule is preferred because immediately exposing the reaction mixture to relatively high polymerization temperature may cause decomposition of one or more monomers. The selection of a particular step-wise heating schedule is obvious to one of ordinary skill in the art. While an optimum polymerization temperature is not unconditionally definable, because this optimum depends on the combination of monomers, temperature exceeds, at least in one step of the polymerization, advantageously 100° C., preferably 120° C., more preferably 140° C. An exemplary heating schedule is for instance 60° C. for 4 hours, 100° C. for 2 hours, 160° C. for 24 hours and 190° C. for 4 hours.

Shall the monomer(s) be aa and bb monomers, an equimolecular mount of aa- and bb-type monomers generally enables preparation of a pre-polymer terminated with a carboxylic acid group from one side and with a ortho-hydroxyamine or ortho-aminethiol group from the other side, a slight excess of aa-type monomer(s) (typically less than 10% mol, preferably less than 5% mol) with respect to stoichiometric, generally enables preparation of a pre-polymer terminated with carboxylic acid groups, and a slight excess of bb-type monomer (typically less than 10% mol, preferably less than 5% mol) generally enables preparation of a pre-polymer terminated with ortho-hydroxyamine or ortho-aminethiol groups.

Shall the monomer(s) be ab monomer, a pre-polymer terminated with a carboxylic acid group from one side and with a ortho-hydroxyamine or ortho-aminethiol group from the other side is generally obtained.

Thus, by means of the polymerization process as above described, it is advantageously possible to prepare a pre-polymer comprising at least one B2 terminated by an azole-forming group.

The polybenzazole block copolymer of the invention has an overall mean degree of polymerization of advantageously at least 70, preferably at least 100.

The polybenzazole block copolymer of the invention has an intrinsic viscosity of advantageously at least 0.5 dl/g, preferably at least 0.6 dl/g, most preferably at least 0.8 dl/g, when measured in $H_2SO_4$ 97% at 30° C.

The polybenzazole block copolymer is advantageously soluble in polar aprotic solvents like NMP, DMSO, DMF, DMA and advantageously soluble in strong acids as methansulfonic acid, triflic acid, chlorosulfonic acid, sulfuric acid, polyphosphoric acid (PPA).

The polybenzazole block copolymer according to the invention can be advantageously synthesized by a polymerization process comprising at least one of the following steps:

(a) contacting in a mineral acid under polymerization conditions a pre-polymer comprising at least one B1 block terminated by a first azole-forming group with a second pre-polymer comprising at least one B2 group terminated by a second azole-forming group capable of reacting with the first azole-forming group;

(b) contacting in a mineral acid under polymerization conditions a pre-polymer comprising at least one B2 block terminated by a first azole-forming group with a second pre-polymer comprising at least one B1 block terminated by a second azole-forming group capable of reacting with the first azole-forming group;

(c) contacting in a mineral acid under polymerization conditions a first pre-polymer comprising at least one B1 block terminated by an azole-forming group with monomer(s) appropriate to form a B2 block;

(d) contacting in a mineral acid under polymerization conditions a first pre-polymer comprising at least one B2 block terminated by an azole-forming group with monomer(s) appropriate to form a B1 block.

The polybenzazole block copolymer of the invention is preferably synthesized by a polymerization process comprising at least one of steps (c) and (d).

Polymerization conditions in anyone of steps (a) to (d) hereinabove preferably require PPA to be used as mineral acid and temperature being between 100 and 240° C.

The concentration of PPA is advantageously from 80 to 86% wt $P_2O_5$, preferably from 82 to 85% wt $P_2O_5$.

While an optimum polymerization temperature is not unconditionally definable, because this optimum depends on the combination of monomer(s) and/or pre-polymer(s), temperature exceeds, at least in one step of the polymerization, advantageously 100° C., preferably 120° C., more preferably 140° C.

It is preferred to carry out the polymerization using a stepwise heating schedule; the selection of a particular step-wise heating schedule is obvious to one of ordinary skill in the art. Similar temperature schedules are those used for the preparation of pre-polymer comprising at least one block B2 can be advantageously applied for the preparation of the polybenzazole block copolymer.

An ortho-diamine, ortho-hydroxyamine and ortho-aminethiol group advantageously reacts with a carboxylic acid group to yield an imidazole, oxazole or thiazole ring, respectively.

A carboxylic acid group advantageously reacts with a group chosen among ortho-diamine, ortho-hydroxyamine and ortho-aminethiol group to yield an imidazole, oxazole or thiazole ring, respectively.

Monomer(s) appropriate to form a B1 block are AA-, BB- and/or AB-type monomers, as above specified.

Monomer(s) appropriate to form a B2 block are aa-, bb- and/or ab-type monomers, as above specified.

At the end of the reaction period, after cooling, the polybenzazole block copolymer can be recovered notably by coagulation in water.

Another object of the invention is a polybenzazole polymer composition comprising the polybenzazole block copolymer as above described.

The polybenzazole polymer composition advantageously comprises at least one polybenzazole polymer different from said polybenzazole block copolymer.

To the purposes of the invention, the term "polybenzazole polymer" is intended to denote a polymer comprising recurring units (R'''), at least 50% by moles of said recurring units comprising at least one benzazole group chosen among the group consisting of benzimidazole, benzothiazole, benzoxazole.

The polybenzazole polymer composition comprises advantageously at most 95% wt, preferably at most 80% wt, more preferably at most 75% wt of the benzazole block copolymer as above described.

According to a preferred embodiment of the invention, in addition to the benzazole block copolymer as above described, the polybenzazole polymer composition comprises at least one polybenzazole polymer comprising sulfonic acid groups and at least one polybenzazole polymer free from sulfonic acid group.

The Applicant thinks, without nevertheless this interpretation limiting the scope of the present invention that the benzazole block copolymer as above described can act as compatibilizer between the sulfonated polymer and the non sulfonated polymer.

The polybenzazole polymer composition of the preferred embodiment comprises advantageously at least 0.5% wt, preferably at least 2.5% wt, more preferably at least 5% wt of the benzazole block copolymer as above described.

The polybenzazole polymer composition of the preferred embodiment comprises advantageously at most 35% wt, preferably at most 30% wt, more preferably at most 25% wt of the benzazole block copolymer as above described.

Another object of the invention is a solid polymer electrolyte membrane comprising the polybenzazole block copolymer as above described or comprising the polybenzazole polymer composition as above described.

The solid polymer electrolyte membrane according to the invention can be advantageously prepared by a process comprising casting the membrane from a casting solution comprising the polybenzazole block copolymer or the polybenzazole polymer composition as above described to obtain a casted film.

The process advantageously further comprises a drying step, comprising heating the casted film at a temperature of at least 100° C., preferably of at least 120° C., more preferably of at least 140° C. to obtain the membrane.

Suitable solvents useful for casting are polar aprotic solvents like NMP, DMSO, DMF, DMA or strong acids as trifluoroacetic acid, methansulfonic acid, triflic acid, chlorosulfonic acid, sulfuric acid, phosphoric acid, polyphosphoric acid (PPA).

Still an object of the invention is a solid polymer electrolyte doped membrane comprising the polybenzazole block copolymer as above specified or comprising the polybenzazole polymer composition as above described.

To the purpose of the invention, the term "solid polymer electrolyte doped membrane" is intended to denote a membrane comprising the polybenzazole block copolymer or the polybenzazole polymer composition as above described, further comprising at least one strong acid.

A solid polymer electrolyte doped membrane can be obtained either
- by a process comprising casting from a casting solution as above described further comprising at least one strong acid; or
- by a process comprising treating a solid polymer electrolyte membrane as above specified with at least one strong acid.

Preferably the strong acid is phosphoric acid ($H_3PO_4$) and/or sulfuric acid, more preferably is phosphoric acid.

The ratio between the number of moles of strong acid and the sum of the number of moles of azole groups in recurring units (R) and recurring units (R') in the doped membrane is advantageously at least 10% mol, preferably at least 25% mol, more preferably at least 100% and advantageously at most 1500% mol, preferably at most 1000% mol, more preferably 400% mol.

To the purpose of the invention, the term "azole group" is intended to denote the benzimidazole group (formula 1a and 1b herein above), the benzothiazole group (formula 3a and 3b herein above) and the benzoxazole group (formula 4a and 4b herein above).

It is generally accepted that, without nevertheless this interpretation limiting the scope of the present invention, that the proton hopping between basic sites on the polybenzazole block copolymer and the imbibed strong acid provides enhanced ionic conductivity.

Still an object of the invention is a fuel cell comprising the polybenzazole block copolymer as above described or comprising the polybenzazole polymer composition as above described.

Preferably the fuel cell of the invention is a hydrogen or methanol fuel cell.

Advantageously, the fuel cell comprises a solid polymer electrolyte membrane or a solid polymer electrolyte doped membrane as above described.

Thanks to the polybenzazole block copolymer as above described, it is possible to maximize ion conductivity without causing unacceptable degree of swelling or even complete dissolution in water or in methanol, while maintaining good mechanical properties and thermal resistance of the solid polymer electrolyte membrane, thus enabling high operating temperature of the fuel cell.

Operations of the fuel cell as above described could be carried out at reduced relative humidity, with no need of complex water management systems, owing to a self-regulation of the internal degree of humidification, thus enabling simplified stack construction and improved reliability.

Some examples of the present invention are reported hereinafter, whose purpose is merely illustrative but not limitative of the scope of the invention itself.

Starting Materials

DAB: 1,1'-biphenyl-3,3',4,4'-tetramine (DAB hereinafter), commercially available from Aldrich was purified by firstly neutralizing free base DAB with aqueous HCl solution, recrystallisation from water in the presence of activated carbon of so produced DAB hydrochloride (DABT, hereinafter), and final DAB recovery via treatment of recrystallized DABT with aqueous NaOH. Purified DAB was shown to have a purity of 99.7%, as determined by HPLC.

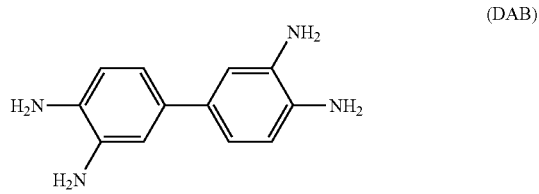
(DAB)

DSBSA: Sodium salt of 4,4'-dicarboxy-3,3'-biphenylsulfone disulfonic acid was prepared by sulfonation of di-p-tolylsulfone (available from Aldrich) with fuming sulfuring acid and subsequent neutralization/precipitation with caustic soda and sodium chloride, and final oxidation of the methyl moieties to carboxylic groups with aqueous NaMnO$_4$, as sketched in the reaction scheme here below:

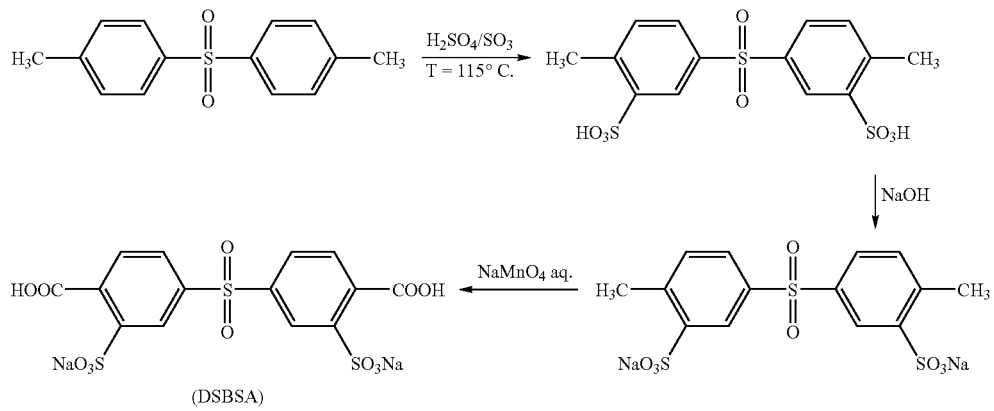
(DSBSA)

Recrystallization in water/ethanol mixture of the so-obtained product resulted in a HPLC purity of 99.8%.

The —SO$_3$Na moieties of DSBSA were easily converted into their corresponding sulfonic acid forms (—SO$_3$H) when DSBSA was mixed with PPA. AHBA: 3-amino-4-hydroxybenzoic acid, commercially available from Aldrich, was purified by recrystallization in water in the presence of activated carbon. Purified AHBA was shown to have a purity of 99.8%, as determined by HPLC.

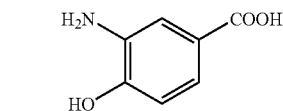
(AHBA)

PPA: a polyphosphoric acid having a P$_2$O$_5$ content of 83.3 wt %, commercially available from Aldrich has been used.

TA: terephthalic acid, commercially available from BP Amoco, having a HPLC purity of 99.8%, was used as received, without any further purification.

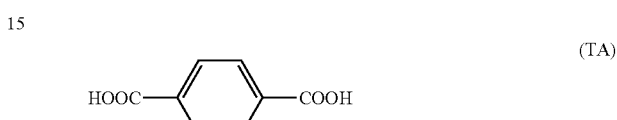
(TA)

TBBA: 4-tert-butylbenzoic acid (TBBA), commercially available from Aldrich, having a purity of 99%, was used as received, without any further purification.

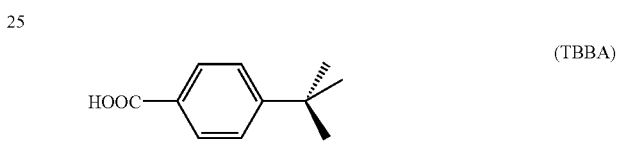
(TBBA)

Analytic Methods

Intrinsic viscosity (IV) was determined in concentrated sulfuric acid (H$_2$SO$_4$ 97% wt) at 30.0° C. using an Ubbelhode viscosimeter.

Ion exchange capacity was measured using the following procedure: the block copolymer sample was immersed into a mixture of aqueous NaCl 0.6 M and NaOH 0.1 M and the mixture was stirred for 24 hours. Excess NaOH was back-titrated using HCl 0.1 M. The ion exchange capacity was thus calculated via the following formula:

$$IEC(\text{meq } SO_3H/g) = 1000 \cdot \frac{n_{NaOH} - n_{HCl}}{wt_{dried\ polymer}}$$

wherein $n_{NaOH}$ denotes the moles of NaOH initially mixed with the block copolymer; $n_{HCl}$ denotes the moles of HCl required for back-titration and $Wt_{dried\ polymer}$ denotes the weight in g of the block copolymer sample.

NMR determination of the average polymerization degree of carboxy-terminated sPBI pre-polymer was carried out as follows. A sample of the reaction mixture comprising the carboxy-terminated sPBI pre-polymer in PPA was added to an excess of 3,4-diaminotoluene. After homogeneization at 150° C. for 2 hours, the resulting mixture was allowed to react for 24 hours at 180° C. In this way, the —COOH end groups of the sPBI pre-polymer were allowed to react quantitatively with the diamine to form a benzimidazole unit with a methyl substituent as side group.

The corresponding polymer was recovered using standard procedure. The average polymerization degree was estimated from NMR spectra as the ratio of integrated area relative to aromatic protons from the DSBSA residues to the integrated area relative to the protons of the methyl terminal side groups. The $^1$H- and $^{13}$C— (1D and 2D) NMR spectra were recorded on a BRUCKER Avance 500 (operating at 500 MHz) and Brucker Avance 400 (operating at 400 MHz) spectrometers, using concentrated $D_2SO_4$ as solvent at 90° C.

EXAMPLE 1

1-a) Preparation of a Carboxy-terminated Pre-polymer Comprising at Least One Block B1 (Carboxy-terminated sPBI Pre-polymer)

6.257 g of DAB (0.0292 mol) and 15.648 g of DSBSA (0.03066 mol) were introduced under inert atmosphere into a 500 ml round-bottomed three-necked flask equipped with mechanical stirring device, a nitrogen inlet and outlet. These amounts corresponded to a 5 mol % excess of dicarboxylic acid monomer with respect to the diamine monomer. Then, 525.7 g of pre-degassed PPA ($P_2O_5$ initial content=81.0 wt %) were added to obtain a monomer concentration of 4.0% by weight. So-obtained mixture was stirred under inert atmosphere at 100° C. for 1 hour using an oil bath, then degassed at 150° C. for 1 hour. Reaction mixture was then allowed to react under inert atmosphere and vigorous stirring for 24 hours at 180° C. A final $P_2O_5$ concentration of 80.7 wt % was expected, as well as a sPBI concentration (in —$SO_3H$ form) of 3.37 wt %.

The reaction mixture was then cooled down to 150° C. Solid $P_2O_5$ (83.2 g) was then added under stirring in order to increase the $P_2O_5$ content to 83.3% wt and the resulting mixture was kept at this temperature for 24 hours for homogeneization.

A sample of the reaction mixture (114.5 g) comprising the carboxy-terminated sPBI pre-polymer was thus withdrawn from the reactor for polymer characterization.

The carboxy-terminated sPBI pre-polymer was found to have an intrinsic viscosity of 0.49 dl/g ($H_2SO_4$ 97% wt, 30.0° C.).

1-b) Synthesis of a Triblock PBO-sPBI—PBO Copolymer by Reaction of the Carboxy-terminated sPBI Pre-polymer with AHBA A AHBA solution in degassed PPA ($P_2O_5$ initial content=83.3 wt %) was prepared under nitrogen atmosphere by dissolving under stirring for 3 hours at 100° C. 13.8 g of AHBA in 464.8 g of PPA.

380.79 g of so-obtained solution, corresponding to an AHBA content of 10.980 g (0.0717 mol) was added to the reaction mixture from step 1-a) in the round-bottomed flask in three equal portions. The molar ratio AHBA/sPBI was thus 3.

The resulting mixture was stirred at 150° C. for 90 minutes, and then at 200° C. for 24 hours after each addition.

After 72 hours, the reaction mixture was cooled down to 150° C. and block copolymer was precipitated in a large excess of distilled water under vigorous stirring.

The polymer was then filtered and washed with distilled water until the filtrate was found to have a neutral pH. After complete extraction in water of residual PPA in a Soxhlet apparatus, the polymer was dried in a vacuum oven at 120° C. under reduced pressure (30 mm Hg) until constant weight.

1-c) Characterisation of the Triblock PBO-sPBI—PBO Copolymer

The triblock polymer was found to have the following structure:

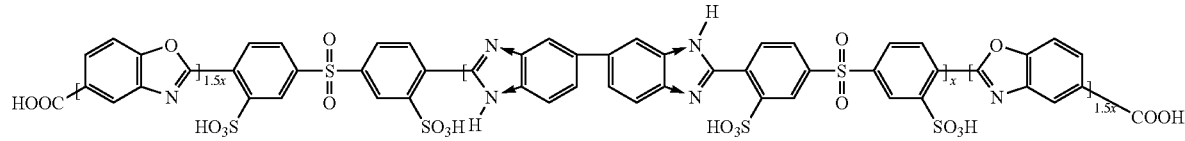

wherein:
the → denotes isomerism so that in any recurring unit within the aromatic benzimidazole structure, the groups to which the arrows point may exist as shown or in an interchanged position;
the average value of x, as determined by NMR was found to be about 14.

The triblock polymer was found to have an IEC of 2.08 meq/g and an intrinsic viscosity of 0.97 dl/g ($H_2SO_4$ 97%, 30° C.).

EXAMPLE 2

2-a) Preparation of an Amine-terminated Pre-polymer Comprising at Least One Block B1 (Amine-terminated sPBI Pre-polymer)

Same procedure as above detailed in 1-a) was repeated, but using 5.050 g of DAB (0.02357 mol) and 11.277 g of DSBSA (0.02210 mol) in 397.1 g of PPA ($P_2O_5$ initial content=83.3 wt %). These amounts corresponded to a 6.7 mol % excess of diamine monomer with respect to the dicarboxylic acid monomer.

The reaction mixture was heated under stirring at 100° C. for 1 h, at 150° C. for 1 h, and allowed to react at 180° C. for 24 hours.

The reaction mixture was then cooled to 150° C.

The amine-terminated sPBI pre-polymer was found to have the following structure:

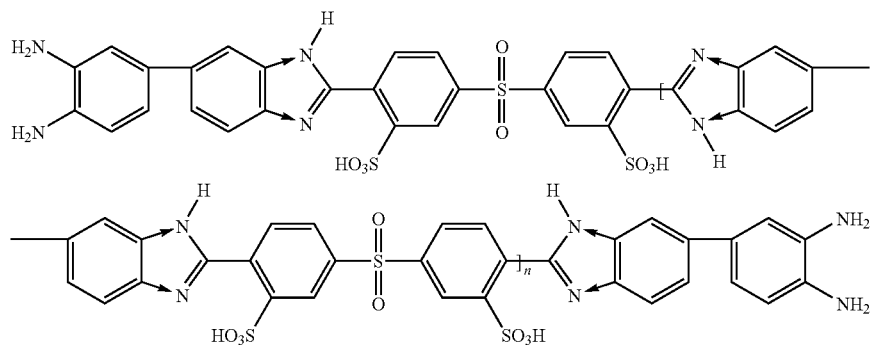

2-b) Synthesis of a Carboxy-terminated Pre-polymer Comprising at Least One Block B2 (Carboxy-terminated PBO Pre-polymer)

Carboxy-terminated PBO pre-polymer was prepared by polymerizing AHBA in the presence of minor amount of t-butylbenzoic acid as end-capping agent.

Thus, 11.070 g of AHBA (0.0723 mol), 0.573 g of t-butylbenzoic acid (0.00321 mol) and 280 g of PPA ($P_2O_5$ initial content=83.3 wt %) were introduced under nitrogen atmosphere into a 250 ml round-bottomed three-necked flask equipped with mechanical stirring device, a nitrogen inlet and outlet.

The resulting mixture was heated following the temperature ramp here below:
100° C. 1 h
150° C. 2 h
160° C. 1 h
170° C. 1 h
180° C. 1 h
and finally allowed to react at 200° C. for 24 hours. It was then cooled to 150° C.

The carboxy-terminated PBO pre-polymer complied with the following structure:

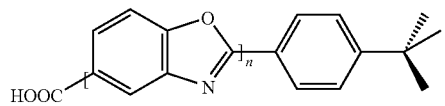

2-c) Synthesis of a Triblock PBO-sPBI—PBO Copolymer by Reaction of the Amine-terminated sPBI Pre-polymer with the Carboxy-terminated PBO Pre-polymer The triblock copolymer was obtained by adding 267.4 g of the reaction mixture obtained from step 2-b) (comprising the carboxy-terminated PBO pre-polymer) to the reaction mixture obtained from step 2-a) (comprising the amine-terminated sPBI pre-polymer).

The resulting mixture was homogenized at 150° C. for 1 hour and allowed to react at 180° C. for 18 hours and at 200° C. for 24 hours. After completion of the reaction, the solution was allowed to cool to 150° C.; the mixture was then poured into a large excess of distilled water under stirring.

The polymer was then filtered and washed with distilled water until the filtrate was found to have a neutral pH. After complete extraction in water of residual PPA in a Soxhlet apparatus, the polymer was dried in a vacuum oven at 120° C. under reduced pressure (30 mm Hg) until constant weight.

2-d) Characterisation of the Triblock PBO-sPBI—PBO Copolymer

The triblock polymer was found to have the following structure:

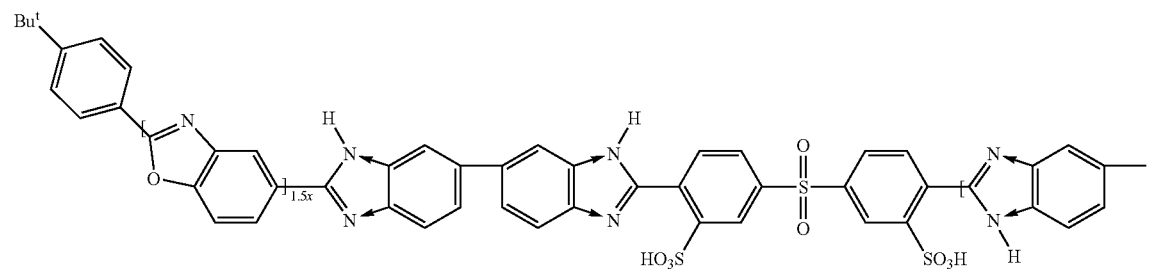

-continued

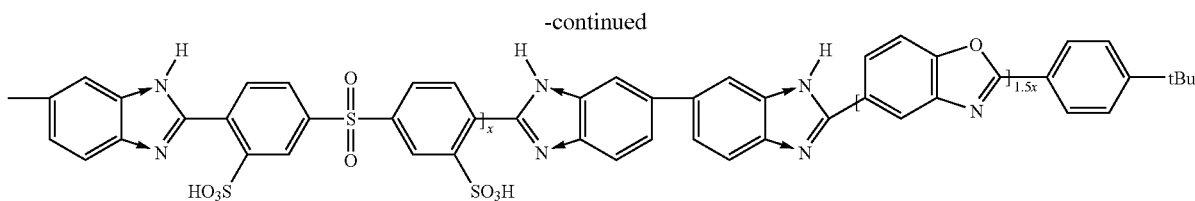

wherein the → denotes isomerism so that in any recurring unit within the aromatic benzimidazole structure, the groups to which the arrows point may exist as shown or in an interchanged position;

The triblock polymer was found to have a IEC of 2.08 meq/g.

EXAMPLE 3

3-a) Preparation of an Amine-terminated Pre-polymer Comprising at Least One Block B1 (Amine-terminated sPBI Pre-polymer)

Same procedure as above detailed in 1-a) was repeated, but using 4.480 g of DAB (0.02091 mol) and 8.004 g of DSBSA (0.01568 mol) in 302.8 g of PPA ($P_2O_5$ initial content=83.3% wt). These amounts corresponded to a 33 mol % excess of diamine monomer with respect to the dicarboxylic acid monomer.

The reaction mixture was heated under stirring at 150° C. for 1 h, at 160° C. for 1 h, at 170° C. for 1 h and allowed to react at 180° C. for 24 hours. The mixture was then cooled to 150° C.

At the end of the polymerization step, a sample of the reaction mixture (78.68 g) comprising the amine-terminated sPBI pre-polymer was withdrawn from the reactor for polymer characterization.

After derivatization with 4-t-butylbenzoic acid, the amine-terminated sPBI pre-polymer was found to have an intrinsic viscosity of 0.14 dl/g ($H_2SO_4$ 97%, 30° C.).

3-b) Synthesis of a Carboxy-terminated Pre-polymer Comprising at Least One Block B2 (Carboxy-terminated PBO Pre-polymer)

Carboxy-terminated PBO pre-polymer was prepared by polymerizing AHBA in the presence of minor amount of terephthalic acid (TA).

Thus, 13.821 g of AHBA (0.09025 mol), 2.507 g of TA (0.01509 mol) and 332.9 g of PPA ($P_2O_5$ initial content=83.3% wt) were introduced under nitrogen atmosphere in a 500 ml round-bottomed three-necked flask equipped with mechanical stirring device, nitrogen inlet and outlet. The resulting mixture was stirred at 100° C. for 1 hour, at 150° C. for 2 hours and allowed to react for 24 hours at 200° C. The reaction mixture was then cooled to 150° C.

The carboxy-terminated PBO pre-polymer was found to have an intrinsic viscosity of 0.59 dl/g ($H_2SO_4$ 97%, 30° C.) and the following structures:

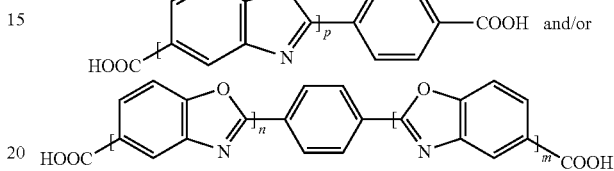

3-c) Synthesis of a Multiblock [sPBI-b-PBO] Copolymer by Reaction of the Amine-terminated sPBI Pre-polymer with the Carboxy-terminated PBO Pre-polymer The multiblock copolymer was obtained by adding the required amount (91.1 g) of the reaction mixture obtained from step 3-b) (comprising the carboxy-terminated PBO pre-polymer) to the reaction mixture obtained from step 3-a) (comprising the amine-terminated sPBI pre-polymer).

The resulting mixture was heated following the temperature ramp here below:

150° C. 0.5 h
160° C. 0.5 h
170° C. 0.5 h and allowed to react at 180° C. for 18 hours and at 200° C. for 24 hours.

After completion of the reaction, the solution was allowed to cool to 150° C.; the mixture was then poured into a large excess of distilled water under stirring.

The polymer was then filtered and washed with distilled water until the filtrate was found to have a neutral pH. After complete extraction in water of residual PPA in a Soxhlet apparatus, the polymer was dried in a vacuum oven at 120° C. under reduced pressure (30 mm Hg) until constant weight.

3-d) Characterisation of the Multiblock [sPBI-b-PBO] Copolymer

The multiblock polymer was found to have an intrinsic viscosity of 1.21 dl/g ($H_2SO_4$ 97%, 30° C.).

The invention claimed is:

1. A polybenzazole block copolymer comprising:
at least one block (B1) comprising recurring units R1, more than 50% by moles of said recurring units comprising at least one of a benzimidazole group of formula 1a and a benzimidazole group of formula 1b, and at least one sulfonic acid group of formula 2;

(formula 1a)

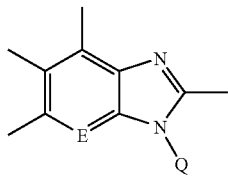

(formula 1b)

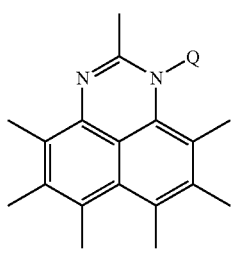

(formula 2)

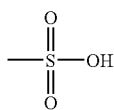

wherein E in formula 1a can be a substituted or non-substituted carbon atom or nitrogen atom, and Q in formula 1a and 1b can be a hydrogen atom or a group comprising a sulfonic acid group; and at least one block (B2) comprising recurring units R2, more than 50% by moles of said recurring units comprising at least one selected from the group consisting of a benzoxazole group of formula 3a, a benzoxazole group of formula 3b, a benzothiazole group of formula 4a and a benzothiazole group of formula 4b, (formula 3a)

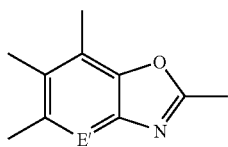

(formula 3b)

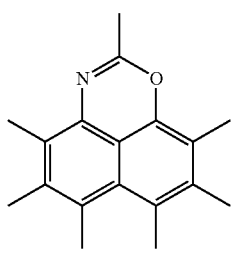

(formula 4a)

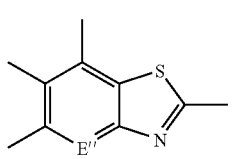

-continued (formula 4b)

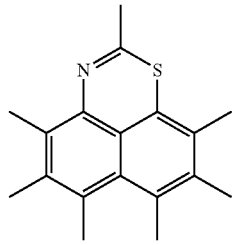

wherein E' and E'' in formula 3a and 4a, respectively, can be independently substituted or non-substituted carbon atom or nitrogen atom, and the block (B2) is substantially free from sulfonic acid groups.

2. The polybenzazole block copolymer of claim 1, wherein the recurring units (R1) are selected from the group consisting of recurring units (R1-a), recurring units (R1-b), recurring units (R1-c), recurring units (R1-d) and mixture thereof:

(R1-a)

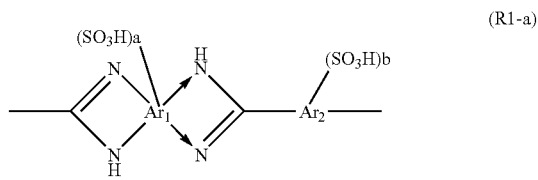

(R1-b)

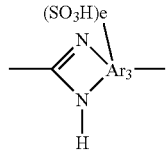

(R1-c)

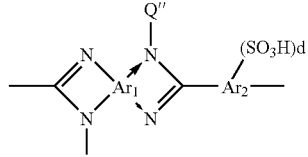

(R1-d)

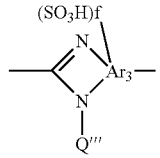

wherein:
the → denotes isomerism so that in any recurring unit within the aromatic benzimidazole structure, the groups to which the arrows point may exist as shown or in an interchanged position;
the

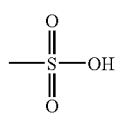

groups may be linked to anyone of the carbon atoms in the $Ar_1$, $Ar_2$ or $Ar_3$ groups;

a is an integer from 0 to 2;
b is an integer from 1 to 2;
d is an integer from 0 to 2
e is an integer from 1 to 2;
f is an integer from 0 to 2;
$Ar_1$ is at least one of:

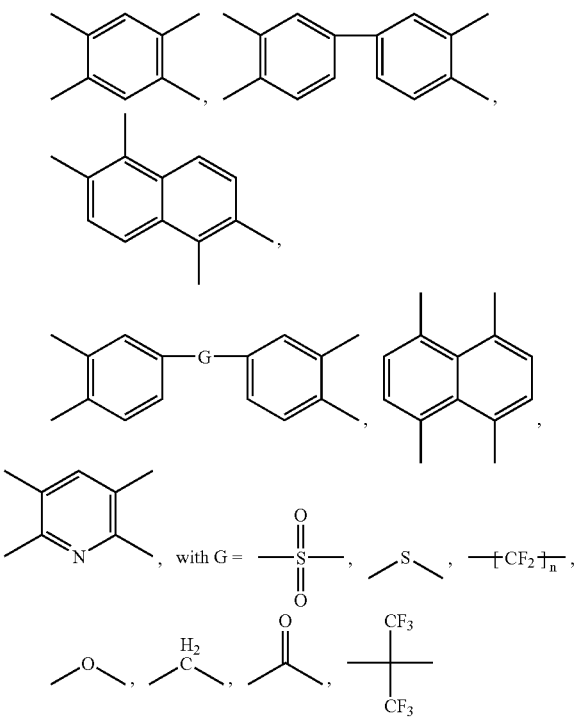

, and with n=0, 1, 2, 3, 4 or 5;
$Ar_2$ is at least one of:

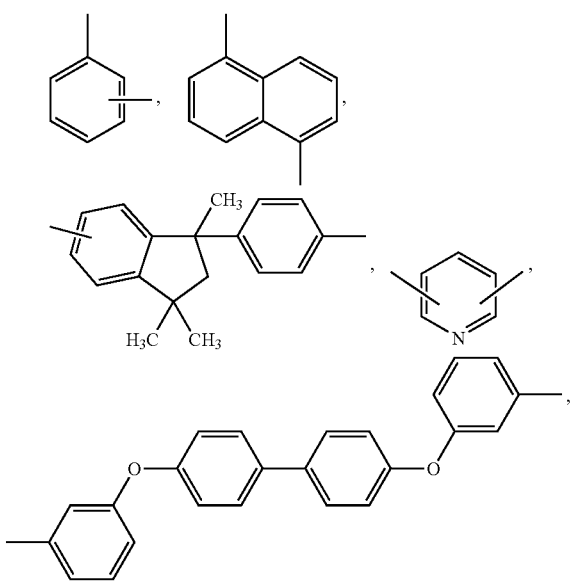

-continued with G having the same meaning as previously indicated;

$Ar_3$ is at least one of:

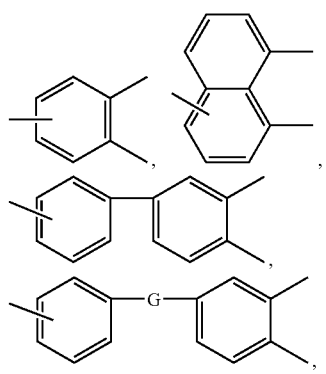

with G having the same meaning as previously indicated;

each of the Q', Q", Q''' moiety can be independently either a hydrogen atom or a group comprising a sulfonic acid group selected from the group consisting of:

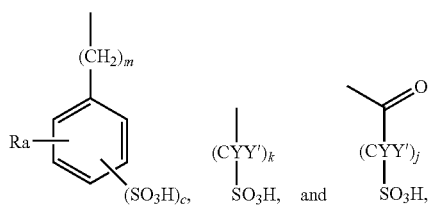

with Ra being a linear or branched alkyl, alkylaryl, aryl or $-NO_2$ group, m being an integer from 0 to 10 and c being an integer from 1 to 2, Y and Y' being independently a hydrogen atom, a fluorine atom, a linear or branched hydrocarbon or fluorocarbon $C_2$-$C_5$ chain, and k and j being independently an integer from 1 to 10;

with the further requirement that if d and f are zero, at least one of Q', Q" and Q''' moieties comprises at least one sulfonic acid group.

3. The polybenzazole block copolymer of claim 2, wherein recurring units (R1) are selected from the group consisting of:

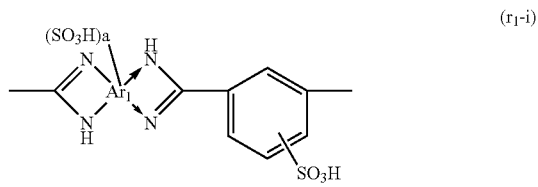

(r₁-i)

-continued (r₁-ii)
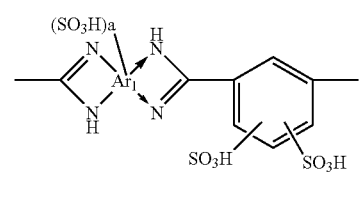

(r₁-iii)
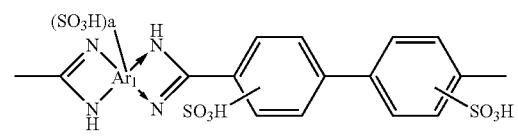

(r₁-iv)
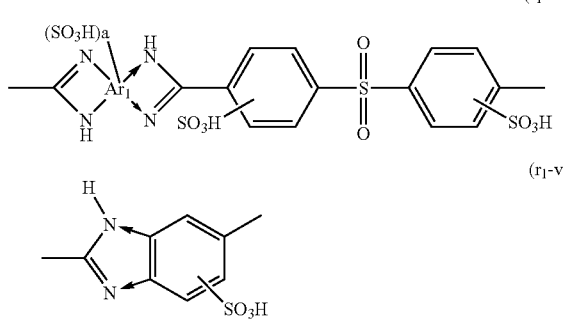

(r₁-v)
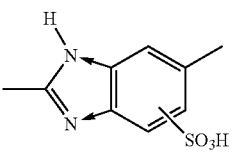

and mixtures thereof,
wherein, in formulae r₁-i to r₁-v here above:
the → denotes isomerism so that in any recurring unit within the aromatic benzimidazole structure, the groups to which the arrows point may exist as shown or in an interchanged position;
a is an integer from 0 to 2;
$Ar_1$ is at least one of:

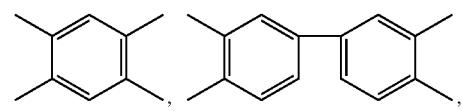

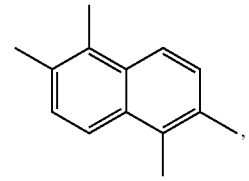

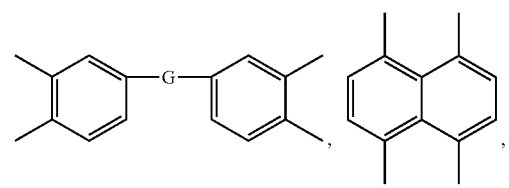

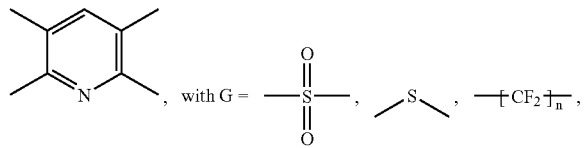, with G =

-continued
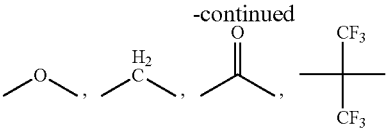

and with n=0,1,2,3,4 or 5;
the

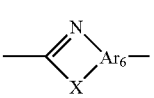

groups may be linked to anyone of the carbon atoms of the $Ar_1$ group or of the phenyl ring which they are linked to.

4. The polybenzazole block copolymer of claim 1, wherein recurring units (R2) are selected from the group consisting of recurring units (R2-a), recurring units (R2-b) and mixture thereof:

(R2-a)
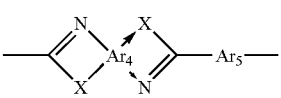

(R2-b)
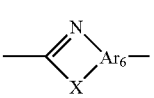

wherein:
the → denotes isomerism so that in any recurring unit within the aromatic benzimidazole structure the groups to which the arrows point may exist as shown or in an interchanged position;
X is an oxygen or sulfur atom;
$Ar_4$ is at least one of:

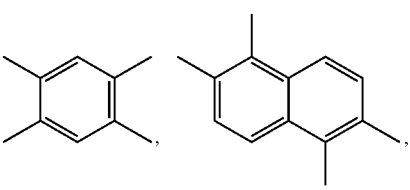

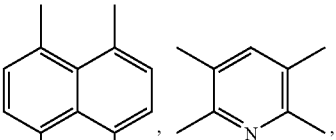

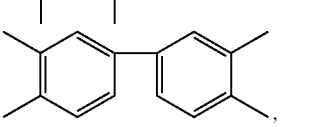

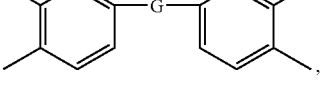

with G =

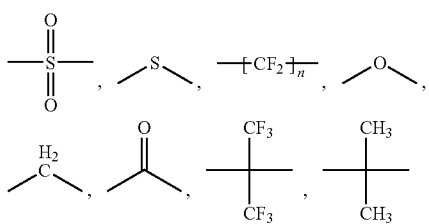

with n=0,1,2,3,4 or 5;
Ar$_5$ is at least one of:

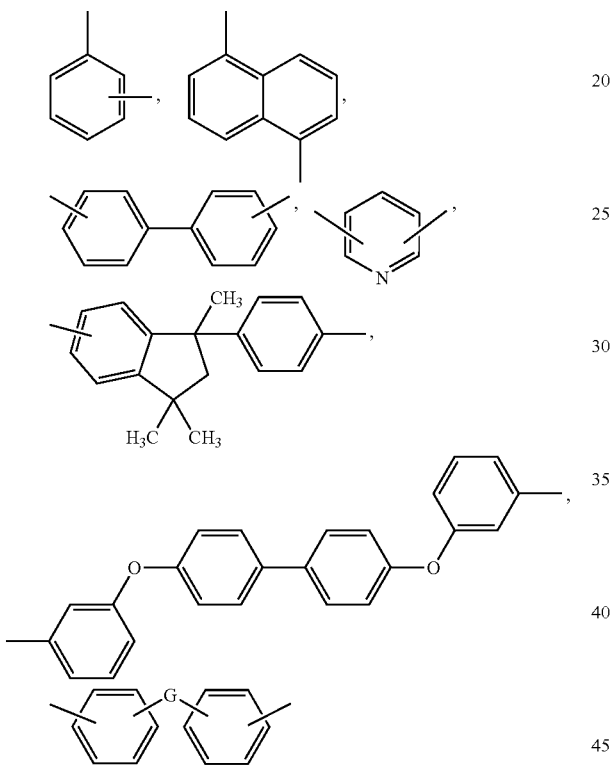

with G having the same meaning as previously indicated;
Ar$_6$ is at least one of:

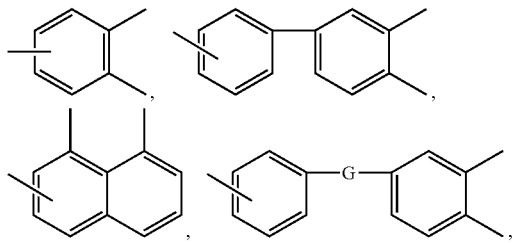

with G having the same meaning as previously indicated.

5. The polybenzazole block copolymer of claim 4, wherein recurring units (R2) are selected from the group consisting of:

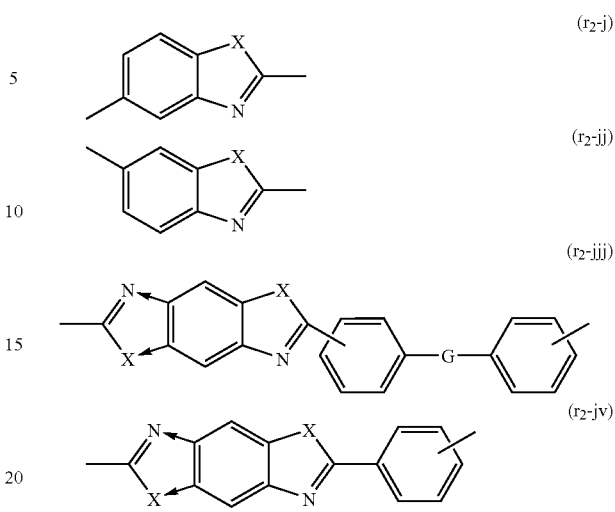

and mixtures thereof,
wherein, in formulae r$_2$-j to r$_2$-jv here above:
the → denotes isomerism so that in any recurring unit within the aromatic benzazole structure, the groups to which the arrows point may exist as shown or in an interchanged position;
X is an oxygen or sulfur atom;

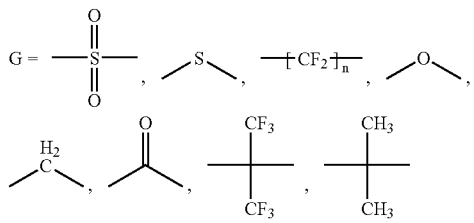

with n=0,1,2,3,4 or 5.

6. A process for manufacturing the polybenzazole block copolymer according to claim 1, comprising at least one of the following steps:
   (a) contacting in a mineral acid under polymerization conditions a pre-polymer comprising at least one B1 block terminated by a first azole-forming group with a second pre-polymer comprising at least one B2 group terminated by a second azole-forming group capable of reacting with the first azole-forming group;
   (b) contacting in a mineral acid under polymerization conditions a pre-polymer comprising at least one B2 block terminated by a first azole-forming group with a second pre-polymer comprising at least one B1 block terminated by a second azole-forming group capable of reacting with the first azole-forming group;
   (c) contacting in a mineral acid under polymerization conditions a first pre-polymer comprising at least one B1 block terminated by an azole-forming group with monomer(s) appropriate to form a B2 block;
   (d) contacting in a mineral acid under polymerization conditions a first pre-polymer comprising at least one B2 block terminated by an azole-forming group with monomer(s) appropriate to form a B1 block.

7. A polybenzazole polymer composition comprising the polybenzazole benzazole block copolymer according to claim 1.

8. A solid polymer electrolyte membrane comprising the polybenzazole benzazole block copolymer according to claim 1.

9. A solid polymer electrolyte doped membrane comprising the polybenzazole block copolymer according to claim 1 and at least one strong acid.

10. A fuel cell comprising the polybenzazole block copolymer according to claim 1.

11. The polybenzazole block copolymer according to claim 1, wherein the block B1 consists of recurring units R1.

12. The polybenzazole block copolymer according to claim 11, wherein the block B2 consists of recurring units of R2.

13. The polybenzazole block copolymer according to claim 1, consisting of blocks B1 and B2.

14. The polybenzazole block copolymer according to claim 13 consisting of blocks B1 and B2.

15. The polybenzazole block copolymer according to claim 1, which is carboxyterminated.

16. The polybenzazole block copolymer according to claim 1, having block B1 of the following formula:

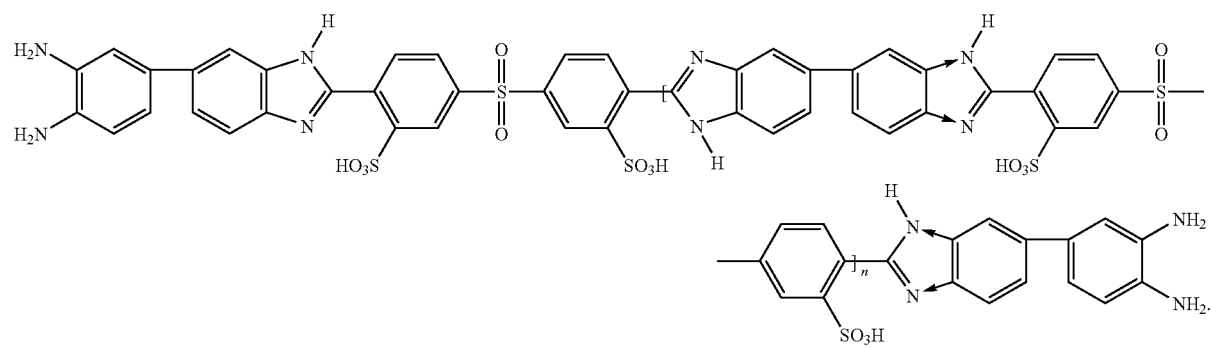

17. The polybenzazole block copolymer according to claim 16, having block B2 of the following formula:

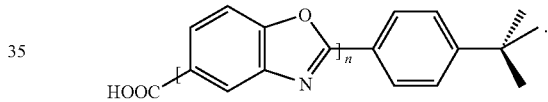

18. The polybenzazole block copolymer according to claim 1, which is a tri-block copolymer having the following formula:

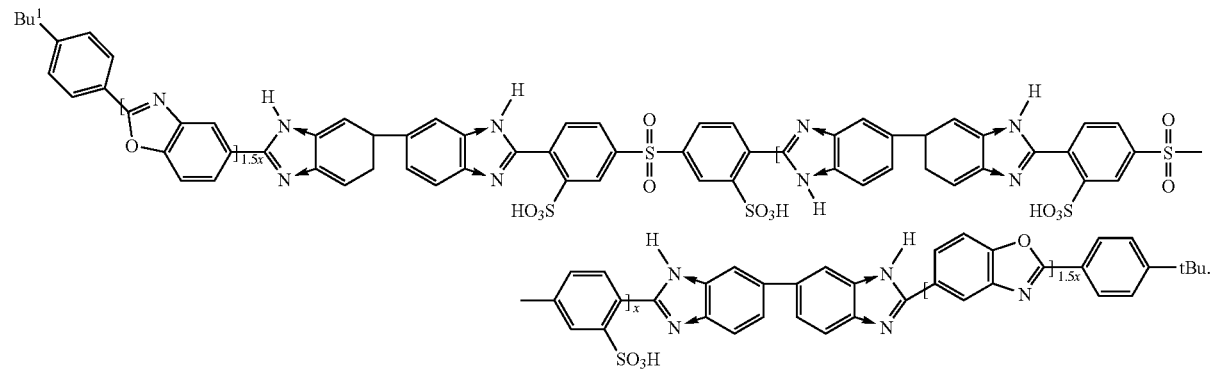

* * * * *